United States Patent
Lim et al.

(10) Patent No.: US 9,654,959 B2
(45) Date of Patent: May 16, 2017

(54) NETWORK-ASSISTED DISCOVERY METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Chiwoo Lim, Suwon-si (KR);
Kyungkyu Kim, Suwon-si (KR);
Daegyun Kim, Seongnam-si (KR);
Hyunseok Ryu, Yongin-si (KR);
Seunghoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 14/075,115

(22) Filed: Nov. 8, 2013

(65) Prior Publication Data
US 2014/0128067 A1 May 8, 2014

(30) Foreign Application Priority Data
Nov. 8, 2012 (KR) .................. 10-2012-0126206

(51) Int. Cl.
*H04W 4/00* (2009.01)
*H04B 1/00* (2006.01)
*H04L 12/28* (2006.01)
*H04W 8/00* (2009.01)
(Continued)

(52) U.S. Cl.
CPC ............ *H04W 8/005* (2013.01); *H04W 48/12* (2013.01); *H04W 48/16* (2013.01); *Y02B 60/50* (2013.01)

(58) Field of Classification Search
CPC .......... H04B 7/00; H04W 4/02; H04W 76/02; H04W 72/04; H04W 68/00; H04Q 7/20
See application file for complete search history.

(56) References Cited

U.S. PATENT DOCUMENTS

| 6,088,591 | A * | 7/2000 | Trompower ......... H04B 1/7143 370/331 |
| 2009/0213760 | A1* | 8/2009 | Shin .................... H04W 74/002 370/254 |
| 2009/0323647 | A1* | 12/2009 | Park et al. .................... 370/338 |

(Continued)

FOREIGN PATENT DOCUMENTS

| KR | 10-2004-0058425 A | 7/2004 |
| KR | 10-2010-0069078 A | 6/2010 |

*Primary Examiner* — Tammy Paige Goddard
*Assistant Examiner* — Frantz Bataille
(74) *Attorney, Agent, or Firm* — Jefferson IP Law, LLP

(57) ABSTRACT

A network-assisted discovery method and apparatus for facilitating Device to Device (D2D) communication in the wireless communication system is provided. The network-assisted discovery method of a terminal in a wireless communication system, the method comprising, broadcasting a discovery signal information in a discovery signal transmission duration of the terminal, receiving assisted discovery information from a base station, determining whether the assisted discovery information comprises the discovery information of the terminal and determining whether to transmit a discovery transmission request message to the base station based on the result of the determination. The network-assisted discovery method and apparatus of the present disclosure is capable of mitigating the problems caused by resource collision and reducing power consumption of the device in the D2D wireless communication system.

18 Claims, 7 Drawing Sheets

(51) Int. Cl.
    *H04W 48/12*     (2009.01)
    *H04W 48/16*     (2009.01)

(56)           References Cited

U.S. PATENT DOCUMENTS

2011/0182205 A1*  7/2011  Gerdes ................ H04L 12/2818
                                                        370/254
2011/0207468 A1*  8/2011  Nakamura et al. ........... 455/450
2012/0178379 A1*  7/2012  Chen ................. H04W 52/0206
                                                         455/68
2012/0250531 A1  10/2012  Patil et al.

* cited by examiner

NETWORK-ASSISTED DISCOVERY METHOD AND APPARATUS FOR USE IN WIRELESS COMMUNICATION SYSTEM

CROSS-REFERENCE TO RELATED APPLICATION(S)

This application claims the benefit under 35 U.S.C. §119 (a) of a Korean patent application filed on Nov. 8, 2012 in the Korean Intellectual Property Office and assigned Serial No. 10-2012-0126206, the entire disclosure of which is hereby incorporated by reference.

TECHNICAL FIELD

The present disclosure relates to a wireless communication system. More particularly, the present disclosure relates to a network-assisted discovery method and apparatus for facilitating Device to Device (D2D) communication in the wireless communication system.

BACKGROUND

With the development of communication devices and technologies, there is a need for services for providing and sharing information. Recently, the smartphone and tablet Personal Computer (PC) make it possible for a user to acquire and share information through a wireless communication system. However, in order for the user to acquire and share the information through the wireless communication system, there is a need for a communication infrastructure. Also, the wireless communication system is not efficient at exchanging trivial but useful information of the type used in everyday life due to system complexity and time delay.

Thus, the Device to Device (D2D) service has been introduced to make it possible for the devices to share device information to establish a communication link for direct communication without a legacy communication infrastructure.

In the D2D wireless communication, a device acquires synchronization with adjacent devices. Afterward, the device performs device discovery at a predetermined time using a predetermined resource to acquire the information on the devices discovered. Here, the device information may include device identity information, interest, and application information.

As described above, the device supporting D2D wireless communication discovers the adjacent devices using the predetermined resource at the predetermined discovery period. That is, the device receives the device information broadcast by adjacent devices on the predetermined resource in the predetermined discovery period to discover the adjacent devices. The device also broadcasts its device information on the predetermined resource in the discovery period in order for other devices to discover it.

Typically, the device discovery and device information broadcast procedure is performed in periodic device discovery period. There is a related-art method in which the device, when lacking in transmit power, sends the discovery signal in the device discovery period occurring at a long interval and, between the device discovery periods, the base station transmits the discovery signal instead of the device.

FIG. 1 is a diagram illustrating a device discovery mechanism according to the related art.

Referring to FIG. 1, the terminals A, B, and C are synchronized with the base station. As shown in part (a) of FIG. 1, the terminal A is the device operating with a normal transmit power and a relatively short discovery signal transmission interval 103. As shown in parts (b) and (c) of FIG. 1, the terminals B and C are devices experiencing power shortage and thus operating with relatively long discovery transmission intervals 105 and 107. At this time, the base station transmits the discovery signals 109 and 111 of the terminals B and C in the discovery signal-off duration between the discovery durations of the terminals B and C instead of the terminals B and C.

At this time, the base station transmits the discovery signals using the same resource as the corresponding device in the discovery signal off-duration.

FIG. 2 is a diagram illustrating a resource structure in a device discovery period according to the related art.

Referring to FIG. 2, the device selects the resource 201 in the discovery signal transmission duration to transmit the discovery signal. Before the next discovery signal transmission duration, the base station transmits the discovery signal instead of the device on the same resource 203 and 205 allocated to the device. If the next discovery signal transmission duration arrives, the device transmits its discovery signal on the resource 207.

In the related-art technology, the base station transmits the same discovery information using the same resource 203 and 204 as the terminal. At this time, the resource 201 selected by the terminal may not be used by the base station due to a resource collision. Also, the related-art technology has a drawback in that the device discovery ranges of the terminal and the base station mismatch due to the different transmission points in searching for adjacent devices and the link distance determination based on the received signal may cause error.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure aims to provide a network-assisted discovery method and apparatus that is capable of reducing the load of a power-constrained device and minimizing a resource collision problem by splitting the discovery signal transmission period into a device discovery signal transmission duration and a base station discovery signal transmission duration in a wireless communication system supporting Device to Device (D2D) communication.

Also, the present disclosure aims to provide a network-assisted discovery method and apparatus that is capable of facilitating a device discovery procedure with a single frame structure available in both the Stand-Alone (SA) and Cellular-Assisted (CA) environments.

In accordance with an aspect of the present disclosure, a network-assisted discovery method of a terminal for use in a wireless communication system is provided. The method includes broadcasting a discovery signal in a discovery signal transmission duration of terminal, determining whether the discovery signal is received by a base station, and transmitting, when the discovery signal is not received by the base station, the discovery signal to the base station.

In accordance with another aspect of the present disclosure, a network-assisted discovery method of a base station for use in a wireless communication system is provided. The method includes receiving a discovery signal from a terminal, broadcasting the discovery signal in a discovery signal transmission duration of base station, determining when the discovery signal is received in next discovery signal transmission duration of terminal, and stopping, when the discovery signal is not received, broadcasting of the discovery signal.

In accordance with another aspect of the present disclosure, a network-assisted discovery apparatus of the terminal for use in a wireless communication system is provided. The apparatus includes a transceiver configured to communicate data with a network node, and a controller configured to control broadcasting of a discovery signal in a discovery signal transmission duration of terminal, determining whether the discovery signal is received by a base station, and transmitting, when the discovery signal is not received by the base station, the discovery signal to the base station.

In accordance with still another aspect of the present disclosure, a network-assisted discovery apparatus of a base station for use in a wireless communication system. The apparatus includes a controller configured to control receiving of a discovery signal from a terminal, broadcasting the discovery signal in a discovery signal transmission duration of base station, determining when the discovery signal is received in next discovery signal transmission duration of terminal, and stopping, when the discovery signal is not received, broadcasting of the discovery signal.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the discovery signal transmission duration of terminal is the duration corresponding to one of two parts obtained by splitting the related-art discovery period and is distinguished from the discovery signal transmission duration of base station corresponding to the other part.

In the present disclosure, the discovery signal transmission duration of base station is the duration corresponding to one of two parts obtained by splitting the related-art discovery period and is distinguished from the discovery signal transmission duration of terminal corresponding to the other part. In the present disclosure, a discovery information can include at least one discovery signal. A assisted discovery information can include at least one discovery information related to at least one terminal base on the received discovery information of the at least one terminal The present disclosure is directed to a network-assisted discovery method for use in a Device-to-Device (D2D) communication system supporting direct communication between two adjacent devices without assistance of the legacy infrastructure such as base station and Access Point (AP).

A brief description is made of the discovery period to which the present disclosure is applied.

Figure 1:
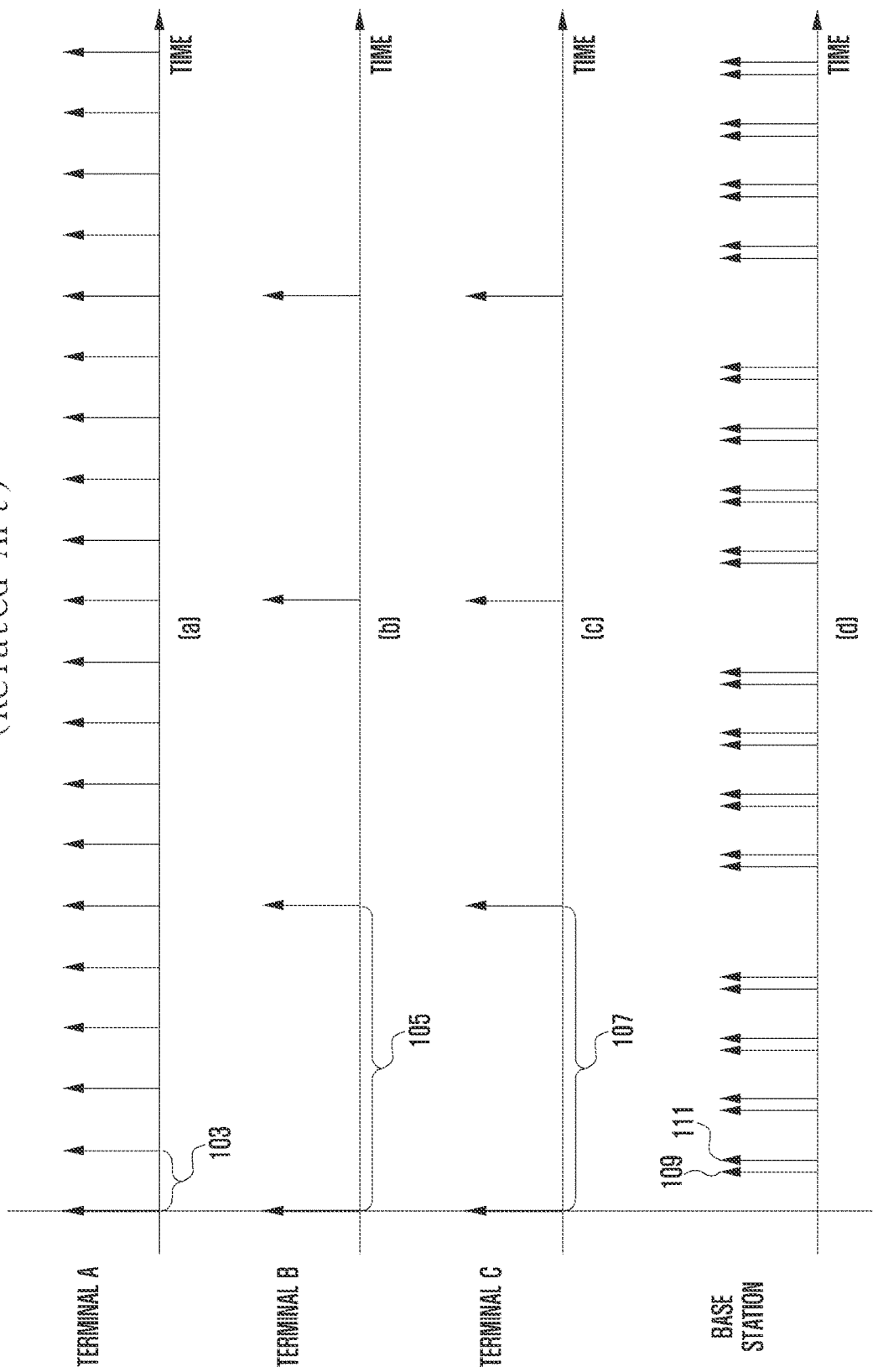
FIG. 1 is a diagram illustrating a device discovery mechanism according to the related art.
Figure 2:
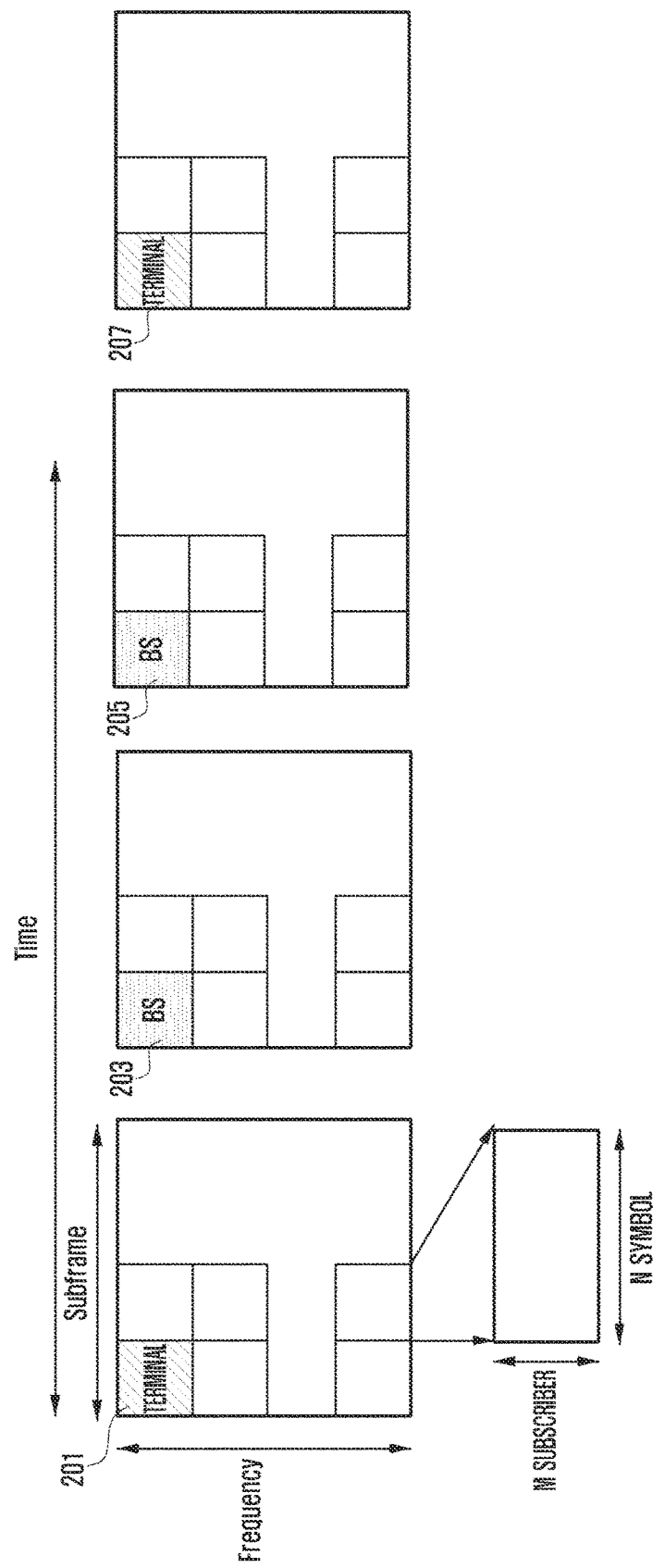
FIG. 2 is a diagram illustrating a resource structure in a device discovery period according to the related art.
Figure 3:
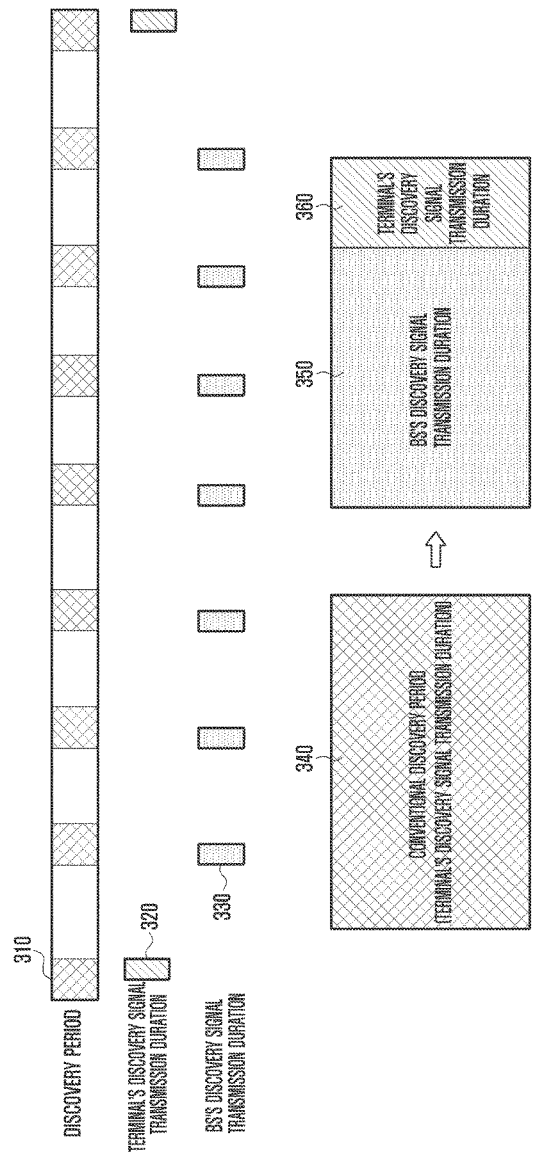
FIG. 3 is a diagram illustrating a discovery period including a discovery signal transmission duration of terminal and a discovery signal transmission duration of base station according to an embodiment of the present disclosure.

FIG. 3 is a diagram illustrating a discovery period including a discovery signal transmission duration of terminal and a discovery signal transmission duration of base station according to an embodiment of the present disclosure.

Referring to FIG. 3, the discovery period 310 occurs at a predetermined interval. The terminal transmits the discovery signal at the discovery signal transmission duration of terminal 320 of the terminal-on discovery period, and the base station transmits the discovery signal at the discovery signal transmission duration of base station 330 of the terminal-off discovery period occurring between two terminal-on discovery periods.

In the related-art technology, the terminal transmits the discovery signal on a certain part of the entire resource 340 allocated for the discovery period. In this case, the base station may not use the same resource selected by the terminal due to the resource collision problem with other terminal, resulting in a discovery signal transmission failure. According to an embodiment of the present disclosure, the discovery period is split into and base station's discovery signal transmission resource 350 and the terminal's discovery signal transmission resource 360 so as to avoid the resource collision with other terminals.

Figure 4:
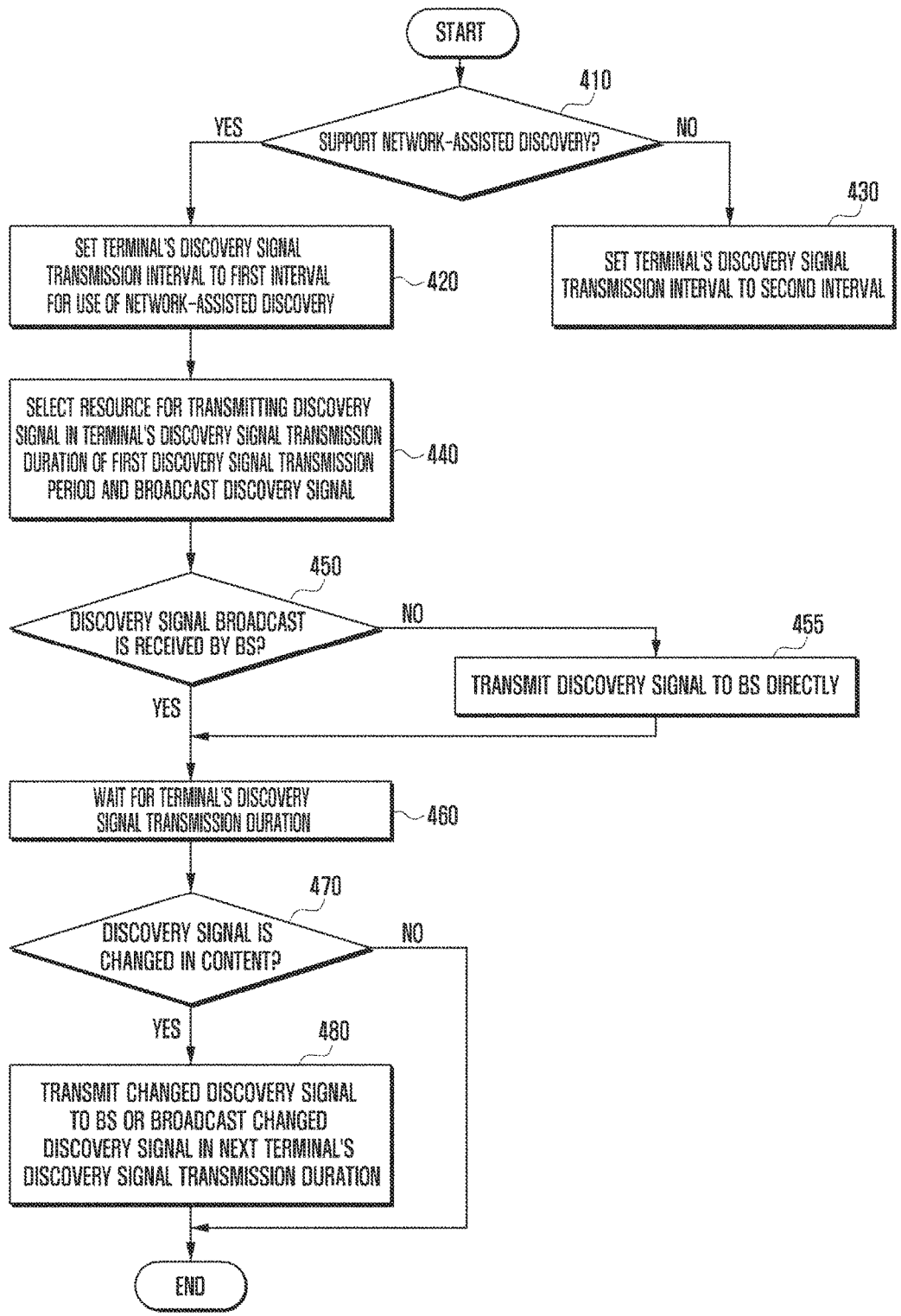
FIG. 4 is a flowchart illustrating a network-assisted discovery method of a terminal in a wireless communication system according to an embodiment of the present disclosure.

FIG. 4 is a flowchart illustrating a network-assisted discovery method of a terminal in a wireless communication system according to an embodiment of the present disclosure.

Referring to FIG. 4, a controller of the base station first determines whether the network-assisted discovery is supported at operation 410 to configure the terminal's discovery signal transmission interval differently depending on a result of the determination. The network-assisted discovery supportability may be checked in various manners. The controller may receive the information on the network-assisted discovery supportability from the base station or may determine the network-assisted discovery supportability by itself according to the terminal condition.

If it is determined that the network-assisted discovery is supported at operation 410, the controller sets the terminal's discovery signal transmission interval to a first interval, e.g., a large value, for the network-assisted discovery at operation 420. Otherwise if it is determined that the network-assisted discovery is not supported at operation 410, the controller sets the terminal's discovery signal transmission interval to a second interval, e.g., a small value, for transmitting the discovery signal without network assistance at operation 430. At this time, the terminal's discovery signal transmission interval may be set to the same value as the related-art method at operation 430.

The proposed method is capable of improving the discovery operation flexibility of the terminal by configuring the terminal's discovery signal transmission interval differently depending on whether the network-assisted discovery is supported and supporting the network-assisted discovery and stand-alone discovery with the same frame structure.

After setting the terminal's discovery signal transmission interval to the first interval, e.g., the large value, at operation 420, the controller controls the terminal to broadcast the terminal discovery signal in the discovery signal transmission duration of terminal at operation 440.

Next, the controller identifies whether the base station has received a discovery signal broadcast by the terminal in the discovery signal transmission duration of terminal at operation 450. The controller is configured to control receiving assisted discovery information from a base station and receiving a notification from the base station. At this time, whether the base station has received the discovery signal is notified explicitly with the notification signal transmitted by the base station or implicitly by checking whether the assisted discovery information including at least one discovery signal of the terminal is broadcast in the discovery signal transmission duration of base station.

If it is determined that the base station has received the discovery signal broadcast in the discovery signal transmission duration of terminal at operation 450, the controller waits for the next discovery signal transmission duration of terminal at operation 460. If it is not determined that the base station has received the discovery signal at operation 450, the controller controls the terminal to transmit the discovery signal to the base station directly at operation 455. The discovery signal directly transmitted to the base station is defined as a discovery signal transmission request message. This is because the base station has not received the discovery signal broadcast by the terminal.

Next, the controller determines whether the content of the discovery signal has been changed at operation 470. If it is determined that the content of the discovery signal has not been changed at operation 470, the procedure ends. However, if it is determined that the content of the discovery signal has been changed at operation 470, the controller controls to transmit the discovery signal changed in content to the base station such that the discovery signal changed in content is broadcast from the next discovery signal transmission duration of base station or the next discovery signal transmission duration of terminal at operation 480, and thereafter the procedure ends.

At the above operation, the discovery signal transmission duration of terminal and the discovery signal transmission duration of base station may be configured by the base station. The discovery signal transmission durations may be received from the base station, particularly in the System Information Block (SIB).

Figure 5:
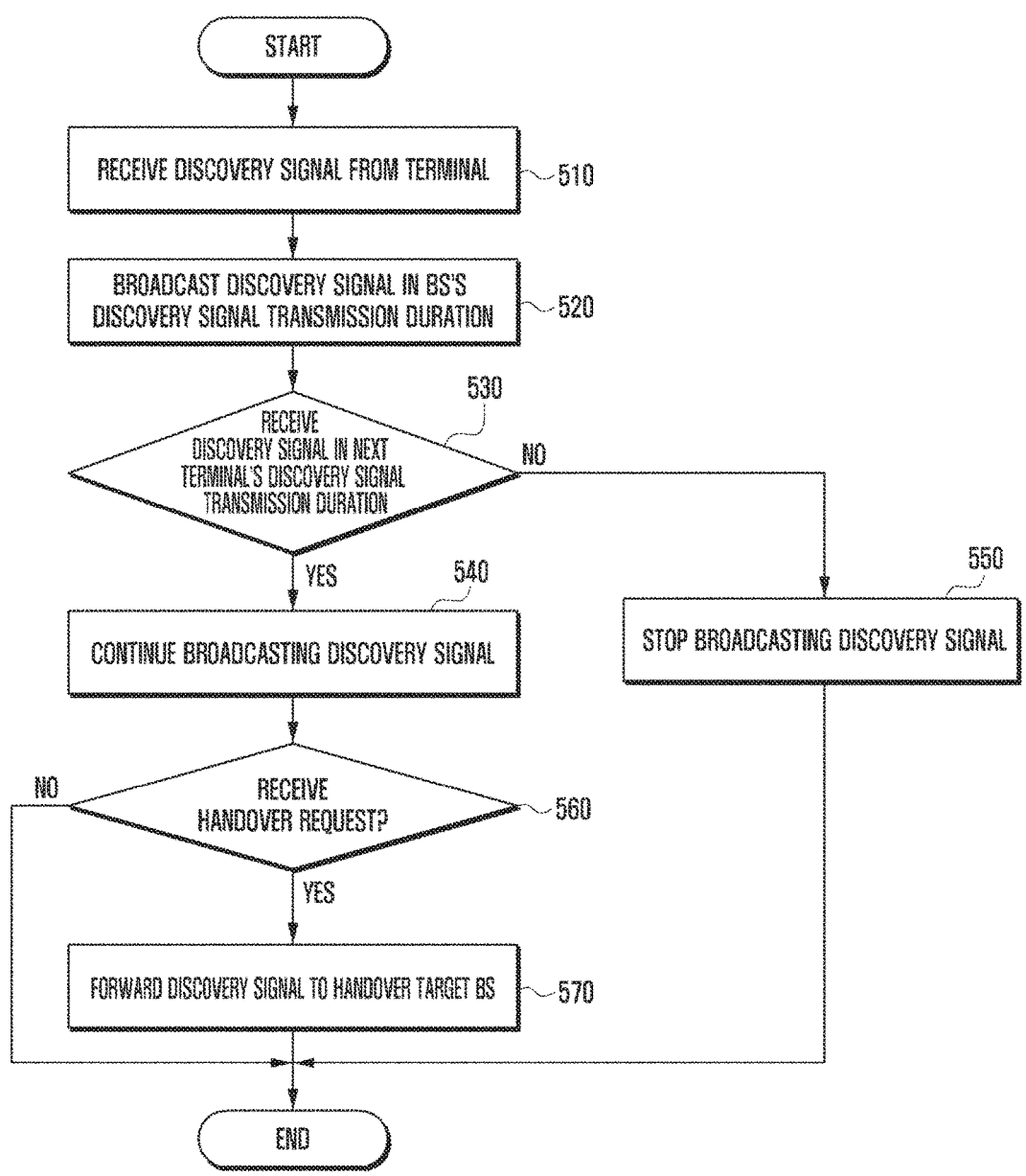
FIG. 5 is a flowchart illustrating a network-assisted discovery method of a base station in a wireless communication according to an embodiment of the present disclosure.

FIG. 5 is a flowchart illustrating a network-assisted discovery method of a base station in a wireless communication according to an embodiment of the present disclosure.

Referring to FIG. 5, the controller of the base station receives the discovery signal transmitted by the terminal at operation 510. At this time, the discovery signal may be the one broadcasted or unicasted by the terminal. As described above, the terminal broadcasts the device discovery signal and transmits, if it is determined that the terminal has failed to receive the signal, the discovery signal to the base station directly. The controller of the base station generates assisted discovery information based on the at least one discovery signal received from at least one terminal.

Afterward, the controller controls the base station to broadcast the received discovery signal in the discovery signal transmission duration of base station at operation 520. This is the network-assisted discovery procedure. The base station is capable of avoiding the resource collision problem with other terminals by broadcasting the discovery signal in the discovery signal transmission duration of base station which is separated from the discovery signal transmission duration of terminal The controller determines whether the discovery signal is received in the next discovery signal transmission duration of terminal at operation 530. This is the process to determine whether to continue the network-assisted device discovery. If the discovery signal is received at operation 530, the controller determines that the terminal's discovery process is ongoing and continues broadcasting the discovery signal at operation 540. If the device discovery signal is not received at operation 530, the controller determines that the terminal's discovery process has ended and stops broadcasting the discovery signal at operation 550, and thereafter the procedure ends.

Next, the controller determines whether a handover request is received from the terminal operating in the network-assisted discovery mode at operation 560. If a handover request is received, the controller may control the base station to forward the discovery signal to the handover target base station at operation 570, and thereafter the procedure ends. The discovery signal forwarding is performed in order to continue the network-assisted discovery with the handover target base station. If no handover request is received at operation 560, the procedure ends.

In the above procedure, the controller may configure the discovery signal transmission duration of terminal and the discovery signal transmission duration of base station before the base station receives the discovery signal from the terminal. The information on discovery signal transmission duration configuration is transmitted to the terminal, particularly in the System Information Block (SIB).

Figure 6:
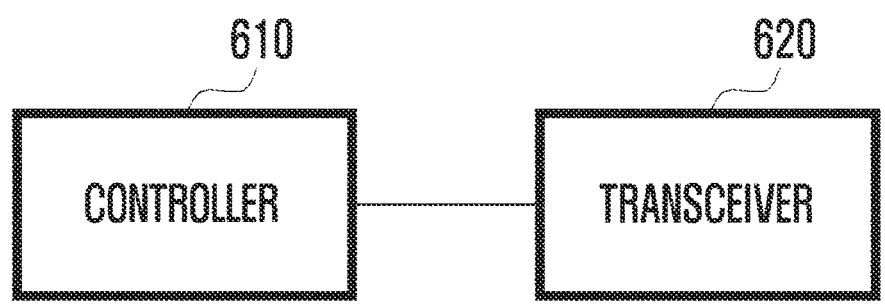
FIG. 6 is a block diagram illustrating a configuration of a terminal according to an embodiment of the present disclosure.

FIG. 6 is a block diagram illustrating a configuration of a terminal according to an embodiment of the present disclosure.

Referring to FIG. 6, the terminal includes a controller 610 and a transceiver 620. The controller 610 controls overall operations of the terminal and, particularly, the network-assisted discovery operation of the terminal according to an embodiment of the present disclosure. The transceiver 620 may communicate data with a network node, particularly the base station, under the control of the controller 610.

Figure 7:
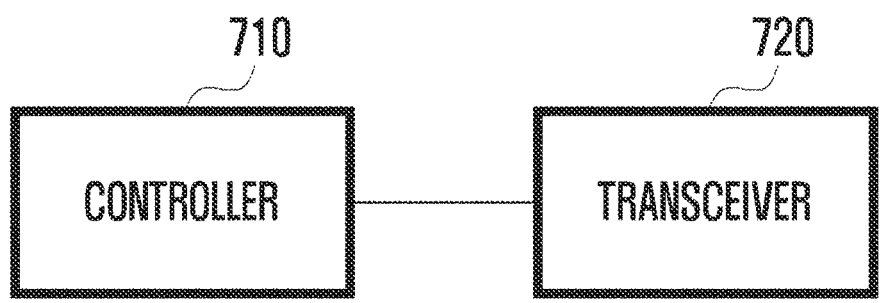
FIG. 7 is a block diagram illustrating a configuration of a base station according to an embodiment of the present disclosure.

FIG. 7 is a block diagram illustrating a configuration of a base station according to an embodiment of the present disclosure.

Referring to FIG. 7, the base station includes a controller 710 and a transceiver 720. The controller 710 controls overall operations of the base station and, particularly, the network-assisted discovery operation of the base station according to an embodiment of the present disclosure. The transceiver 720 may communicate data with an external device, particularly the terminal and another base station, under the control of the controller 710.

The network-assisted discovery method and apparatus of the present disclosure is capable of mitigating the problems caused by resource collision and may reduce power consumption of the device in the Device to Device (D2D) wireless communication system.

While the present disclosure has been shown and described with reference to various embodiments thereof, it will be understood by those skilled in the art that various changes in form and details may be made without departing from the spirit and scope of the present disclosure as defined by the appended claims and their equivalents.

What is claimed is:

1. A network-assisted discovery method of a terminal in a wireless communication system, the method comprising:
   broadcasting discovery information of the terminal in a discovery signal transmission duration of the terminal;
   receiving first assisted discovery information from a base station;
   determining whether the first assisted discovery information includes the discovery information; and
   transmitting a discovery signal transmission request message to the base station if the discovery information of the terminal is not included in the received first assisted discovery information,
   wherein the discovery signal transmission request message requests the base station to broadcast second assisted discovery information including the discovery information of the terminal,
   wherein another terminal discovers the terminal based on the discovery information in the second assisted discovery information, and
   wherein a discovery resource associated with the discovery information is split into a first discovery signal transmission resource of the terminal and a second discovery signal transmission resource of the base station.

2. The method of claim 1, further comprising:
   receiving a notification from the base station in response to receiving of the broadcasted discovery information at the base station.

3. The method of claim 1, further comprising:
   transmitting, if it is determined that the discovery information of the terminal is not comprised in the first assisted discovery information, the discovery transmission request message to the base station.

4. The method of claim 1, further comprising:
   waiting, if it is determined that the discovery information of the terminal is comprised in the first assisted discovery information, until a next discovery signal transmission duration of the terminal.

5. The method of claim 2, further comprising:
   determining whether the base station received the discovery information of the terminal by checking at least one of whether the notification is received and whether the discovery information is included in the first assisted discovery information.

6. The method of claim 1, further comprising:
   performing, if the discovery information of the terminal is changed, one of transmitting the changed discovery information to the base station and broadcasting the changed discovery information in a next discovery transmission duration the of terminal.

7. The method of claim 1, further comprising:
   determining, before the broadcasting of the discovery information, whether the network-assisted discovery is supported,
   setting, if the network-assisted discovery is supported, the discovery signal transmission duration of the terminal to a first duration for network-assisted discovery to broadcast the discovery information; and
   setting, if the network-assisted discovery is not supported, the discovery signal transmission duration of the terminal to a second duration shorter than the first duration to broadcast the discovery information.

8. The method of claim 1, further comprising:
   receiving, before broadcasting of the discovery information, a configuration on the discovery signal transmission duration of the terminal and the discovery signal transmission duration of the base station from the base station,
   wherein the discovery signal transmission duration of the terminal is different from a discovery signal transmission duration of the base station.

9. The method of claim 8, wherein the receiving of the configuration comprises receiving the configuration in a System Information Block (SIM).

10. A network-assisted discovery method of a base station in a wireless communication system, the method comprising:
    generating first assisted discovery information not including discovery information of a terminal;
    broadcasting, by the base station, the first assisted discovery information in a discovery signal transmission duration of the base station;
    receiving, from the terminal, a discovery signal transmission request message including discovery information of the terminal; and
    broadcasting second assisted discovery information including the discovery information based on the discovery signal transmission request message,
    wherein another terminal discovers the terminal based on the discovery information in the second assisted discovery information,
    wherein a discovery signal transmission duration of the terminal is different from the discovery signal transmission duration of the base station, and
    wherein a discovery resource associated with the discovery information is split into a first discovery signal transmission resource of the terminal and a second discovery signal transmission resource of the base station.

11. The method of claim 10, further comprising:
   determining whether the discovery information is received in a next discovery signal transmission duration of the terminal; and
   determining whether to stop the broadcasting of the second assisted discovery information based on the result of determination.

12. The method of claim 11, further comprising:
   stopping, if the discovery information is not received in the next discovery signal transmission duration of the terminal, broadcasting of the second assisted discovery information.

13. The method of claim 10, further comprising:
   forwarding, if a handover request is received from the terminal, information related to the second assisted discovery information to a handover target base station.

14. A network-assisted discovery apparatus of a terminal in a wireless communication system, the apparatus comprising:
   a memory configured to store instructions therein;
   a transceiver configured to communicate data with a network node; and
   at least one processor,
   wherein, upon execution of the instructions, the at least one processor is configured to:
      broadcast discovery information of the terminal in a discovery signal transmission duration of the terminal;
      receive first assisted discovery information from a base station;
      determine whether the first assisted discovery information includes the discovery information of the terminal; and
      transmit a discovery signal transmission request message to the base station if the discovery information of the terminal is not included in the received first assisted discovery information,
   wherein the discovery signal transmission request message requests the base station to broadcast second assisted discovery information including the discovery information of the terminal,
   wherein another terminal discovers the terminal based on the discovery information in the second assisted discovery information, and
   wherein a discovery resource associated with the discovery information is split into a first discovery signal transmission resource of the terminal and a second discovery signal transmission resource of the base station.

15. The apparatus of claim 14, wherein the at least one processor is further configured to control receiving a notification from the base station in response to receiving of the broadcasted discovery information at the base station.

16. The apparatus of claim 14, wherein the at least one processor is further configured to control transmitting, if it is determined that the discovery information of the terminal is not comprised in the first assisted discovery information, the discovery signal transmission request message to the base station.

17. A network-assisted discovery apparatus of a base station in a wireless communication system, the apparatus comprising:
   a memory configured to store instructions therein;
   a transceiver configured to communicate data with a network node; and
   at least one processor,
   wherein, upon execution of the instructions, the at least one processor is configured to:
      generate first assisted discovery information not including discovery information for a terminal,
      broadcast, by the base station, the first assisted discovery information in a discovery signal transmission duration of the base station,
      receive a discovery signal transmission request message including discovery information of the terminal from the terminal, and
      broadcast second assisted discovery information including the received discovery information of the terminal based on the discovery signal transmission request message,
   wherein another terminal discovers the terminal based on the discovery information in the second assisted discovery information,
   wherein a discovery signal transmission duration of the terminal is different from the discovery signal transmission duration of the base station, and
   wherein a discovery resource associated with the discovery information is split into a first discovery signal transmission resource of the terminal and a second discovery signal transmission resource of the base station.

18. The apparatus of claim 17, wherein the at least one processor is further configured to control determining whether the discovery information is received in a next discovery signal transmission duration of the terminal and stopping, if it is determined that the discovery information is not received in the next discovery signal transmission duration of the terminal, broadcasting of the second assisted discovery information.

* * * * *